US012566587B2

(12) United States Patent
Balakrishnan et al.

(10) Patent No.: US 12,566,587 B2
(45) Date of Patent: Mar. 3, 2026

(54) REAL-TIME COMPUTING RESOURCE DEPLOYMENT AND INTEGRATION

(71) Applicant: INTERNATIONAL BUSINESS MACHINES CORPORATION, Armonk, NY (US)

(72) Inventors: Preethi Balakrishnan, Chennai (IN); Shikhar Kwatra, San Jose, CA (US); Hemant Kumar Sivaswamy, Pune (IN); Venkata Vara Prasad Karri, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 17/688,887

(22) Filed: Mar. 7, 2022

(65) Prior Publication Data

US 2023/0280982 A1 Sep. 7, 2023

(51) Int. Cl.
*G06F 8/30* (2018.01)
*G06F 8/60* (2018.01)
(Continued)

(52) U.S. Cl.
CPC .................. *G06F 8/30* (2013.01); *G06F 8/60* (2013.01); *G06F 11/3006* (2013.01); *G06F 11/3409* (2013.01)

(58) Field of Classification Search
None
See application file for complete search history.

(56) References Cited

U.S. PATENT DOCUMENTS 8,762,997 B2 6/2014 Moon et al.
9,444,896 B2 * 9/2016 Zheng .................... H04L 67/34
(Continued)

FOREIGN PATENT DOCUMENTS

AU 20162540432 A1 12/2017
CN 103593452 A 2/2014

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.
(Continued)

*Primary Examiner* — Lewis A Bullock, Jr.
*Assistant Examiner* — Mark A Gooray
(74) *Attorney, Agent, or Firm* — CHIP LAW GROUP

(57) ABSTRACT

Real-time resource deployment and integration can include determining one or more performance priorities for a user computer system based on a plurality of system-generated processing metrics. Based on the one or more performance priorities, a candidate cloud-based service can be determined among one or more previously unanalyzed cloud-based services identified by an automated watcher configured to search a plurality of communication network sites. The current performance of the user computer system can be compared to a potential performance of the user computer system were the candidate cloud-based service deployed. A script can be generated in response to determining, based on the comparing, that deploying the candidate cloud-based service improves performance of the user computer system with respect to the performance priorities. The script reconfigures the user computer system in real-time by automatically deploying the candidate cloud-based service.

20 Claims, 6 Drawing Sheets

(51) Int. Cl.

| | |
|---|---|
| ***G06F 11/30*** | (2006.01) |
| ***G06F 11/34*** | (2006.01) |

(56) References Cited

U.S. PATENT DOCUMENTS

| | | | | |
|---|---|---|---|---|
| 10,026,070 | B2 | 7/2018 | Thorpe et al. | |
| 2013/0326032 | A1* | 12/2013 | Duarte | H04L 41/0803 709/221 |
| 2016/0034835 | A1 | 2/2016 | Levi et al. | |
| 2017/0149875 | A1* | 5/2017 | Iyengar | H04L 47/83 |
| 2019/0171513 | A1 | 6/2019 | Purushothaman | |
| 2019/0303232 | A1 | 10/2019 | Antonio et al. | |
| 2020/0233707 | A1 | 7/2020 | Ramamurthy et al. | |
| 2022/0035343 | A1* | 2/2022 | Singh | G06F 8/60 |
| 2023/0221995 | A1* | 7/2023 | Sellari | G06F 9/5016 711/104 |
| 2024/0061721 | A1* | 2/2024 | Wu | G06F 9/5072 |

OTHER PUBLICATIONS

"DevOps Robotic Process Automation and Artificial Intelligence Remediation," P.com Prior Art Database, Technical Disclosure No. IPCOM000264994D, Feb. 16, 2021, 7 pg.

"IBM Cloud Pak for BUsiness Automation," [online] IBM.com [retrieved Nov. 17, 2021], retrieved from the Internet: <https://www.ibm.com/cloud/cloud-pak-for-business-automation>, 11 pg.

Hashim, M., "Bridging Digital Transformations Through RPA," Dell Technologies, Dell Inc. Copyright 2020, 33 pg.

* cited by examiner

REAL-TIME COMPUTING RESOURCE DEPLOYMENT AND INTEGRATION

BACKGROUND

This disclosure relates to computer systems, and more particularly, to the deployment and integration of distributed computing resources.

Computer systems vary in type and complexity depending on the user. Many large and medium sized enterprises, for example, rely on computer systems that include not only their own data centers and in-house computing resources but also resources and services supplied by cloud-based service providers. Cloud-based resources provide an enterprise or other user a number of benefits, including on-demand scaling without large upfront investment or long-term commitment.

SUMMARY

In one or more embodiments, a method can include determining one or more performance priorities for a user computer system based on multiple system-generated processing metrics. The method can include detecting, based on the one or more performance priorities, a candidate cloud-based service among one or more previously unanalyzed cloud-based services identified by searching a plurality of communication network sites. The method can include comparing, based on performance metrics corresponding to the one or more performance priorities, a current performance of the user computer system and a potential performance of the user computer system were the candidate cloud-based service deployed. The method can include determining, based on the comparing, that deploying the candidate cloud-based service improves performance of the user computer system with respect to the performance priorities. The method can include generating a script that comprises computer-implemented code to reconfigure the user computer system in real-time by automatically deploying the candidate cloud-based service.

In one or more embodiments, a system includes a processor configured to initiate operations. The operations can include determining one or more performance priorities for a user computer system based on multiple system-generated processing metrics. The operations can include detecting, based on the one or more performance priorities, a candidate cloud-based service among one or more previously unanalyzed cloud-based services identified by searching a plurality of communication network sites. The operations can include comparing, based on performance metrics corresponding to the one or more performance priorities, a current performance of the user computer system and a potential performance of the user computer system were the candidate cloud-based service deployed. The operations can include determining, based on the comparing, that deploying the candidate cloud-based service improves performance of the user computer system with respect to the performance priorities. The operations can include generating a script that comprises computer-implemented code to reconfigure the user computer system in real-time by automatically deploying the candidate cloud-based service.

In one or more embodiments, a computer program product includes one or more computer readable storage media having instructions stored thereon. The instructions are executable by a processor to initiate operations. The operations can include determining one or more performance priorities for a user computer system based on multiple system-generated processing metrics. The operations can include detecting, based on the one or more performance priorities, a candidate cloud-based service among one or more previously unanalyzed cloud-based services identified by searching a plurality of communication network sites. The operations can include comparing, based on performance metrics corresponding to the one or more performance priorities, a current performance of the user computer system and a potential performance of the user computer system were the candidate cloud-based service deployed. The operations can include determining, based on the comparing, that deploying the candidate cloud-based service improves performance of the user computer system with respect to the performance priorities. The operations can include generating a script that comprises computer-implemented code to reconfigure the user computer system in real-time by automatically deploying the candidate cloud-based service.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
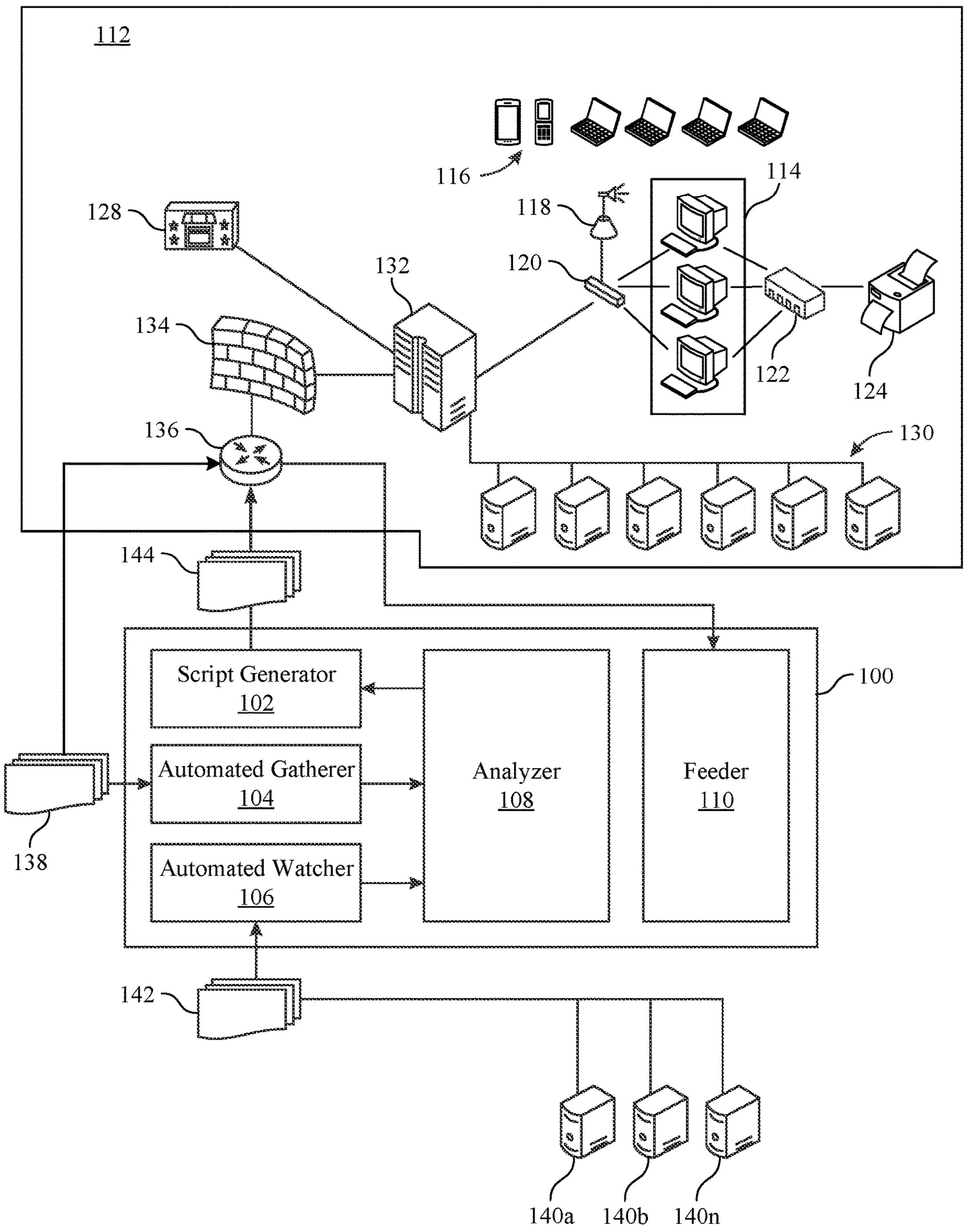
FIG. 1 illustrates an example real-time computing resource deployment and integration system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to computer systems, and more particularly, to the deployment and integration of distributed computing resources. Although computer system users such as medium to large sized enterprises can integrate their own in-house computing resources with those supplied by cloud-based service providers, the users may not leverage all options available to them. In particular, the computer system users may not optimally leverage the various resources available from different cloud-based service providers. Cost, data throughput, or information governance, for example—singly or in combination—may be critical to the success of an enterprise. Nonetheless, the enterprise may not avail itself of the availability of cloud-based resources or achieve an optimal mix of in-house and cloud-based resources with respect to cost, data throughput, or information governance. The failure to do so is very likely due to the labor intensity of manually performing the necessary tasks of identifying which resources are available, determining an optimal mix of resources, and performing the different operations needed to deploy and integrate the resources into the enterprise computer system.

The systems, methods, and computer program products disclosed herein are capable of fully automating a real-time deployment and integration of distributed computing resources. The inventive arrangements disclosed herein can continuously identify available resources, automatically deploy the resources, and automate the real-time deployment and integration of the resources. The resources can be identified and deployed in real-time as needed to remediate a computer system problem or enhance the computer system's performance.

An aspect of the inventive arrangements is a combination analyzer and script generator endowed with intelligence (e.g., machine learning) to determine specific processing priorities of a user (e.g., data throughput, information governance, cost, or a combination thereof) and generate a script that automates the deployment of resources based on the priorities and independent of human effort. The script can include declarative code and migration parameters for an automated deployment and integration of deployed resources into a user computer system.

Another aspect of the inventive arrangements is an automated canvassing of network sites of cloud-based service providers to automatically discover previously unanalyzed cloud-based services. Each newly discovered cloud-based service is automatically analyzed. In certain arrangements, the analysis sets forth for the user the pros and cons of integrating one or more previously unanalyzed cloud-based services into the user's computer system. For example, given that throughput or information governance may be a priority for a user, a cloud-based service that increases the computer system's throughput or enhances the computer system's information governance favors deployment (is pro), whereas incurring a greater cost to obtain the cloud-based service argues against deployment (is con). In other arrangements, the analysis determines whether deploying one or more previously unanalyzed cloud-based services remediates a deficiency of the user computer system or otherwise enhances the system's operating efficiency. If so, deployment of the one or more previously unanalyzed cloud-based services is automatically performed according to the declarative code and migration parameters of the automatically generated script.

In certain arrangements, the inventive arrangements analyze and categorize the financial spend of the user on each cloud-based service per cloud-based service provider in the context of user priorities such as cost, information governance, and data throughput. The analysis determines a mix of cloud-based and in-house resources that can be effectively and efficiently used. Various processes are automated using one or more robotic process automation workflows. As defined herein, "robotic process automation" means processor-executable code that builds, deploys, and manages one or more software robots (also referred to as "bots"). The software robots that are built, deployed, and managed by robotic process automation are capable of detecting human-computer and computer-computer interactions during a computer-implemented process and automating the process by replicating the actions without human interaction.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 2:
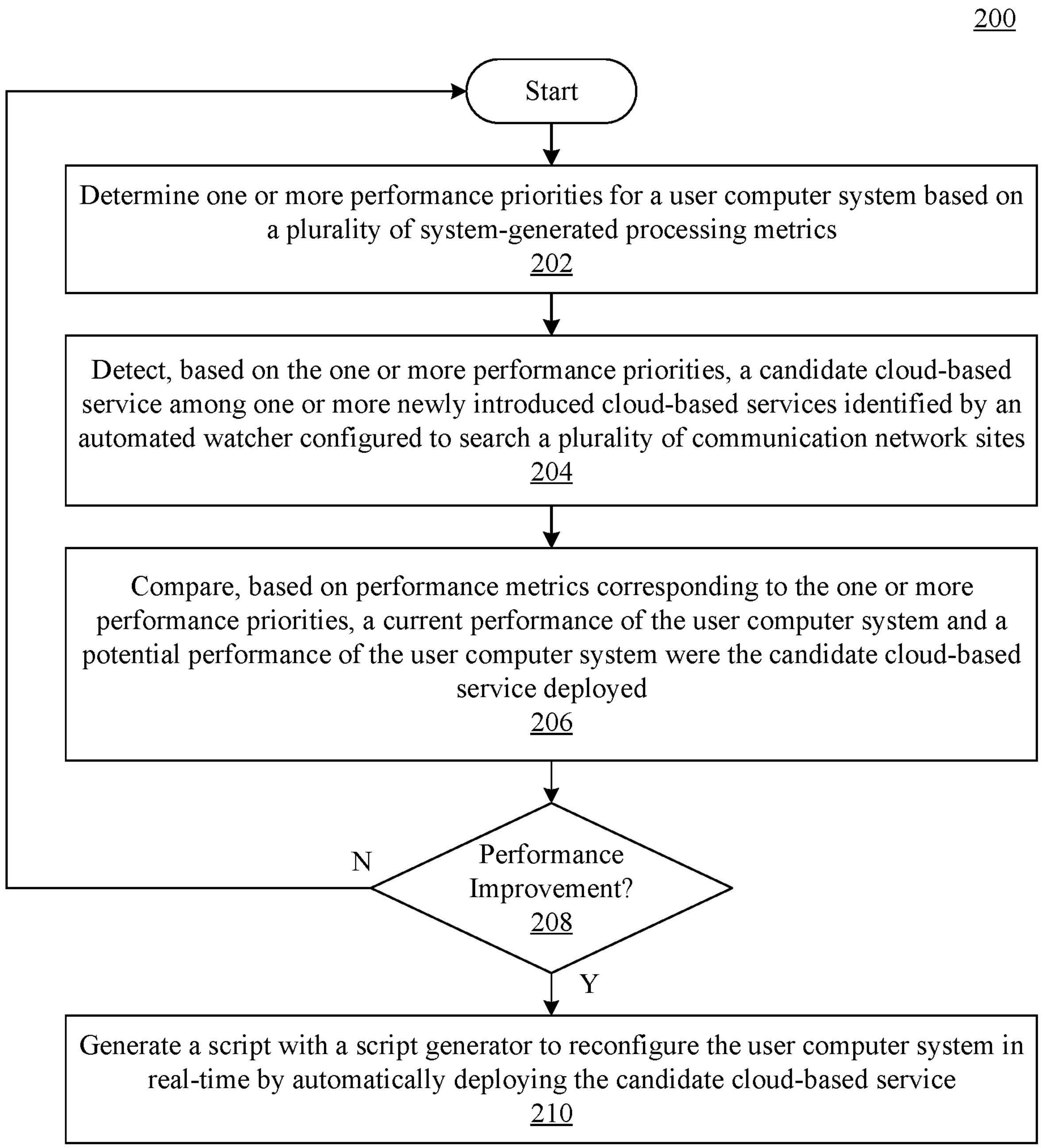
FIG. 2 illustrates an example method performed by the system of FIG. 1.
Figure 5:
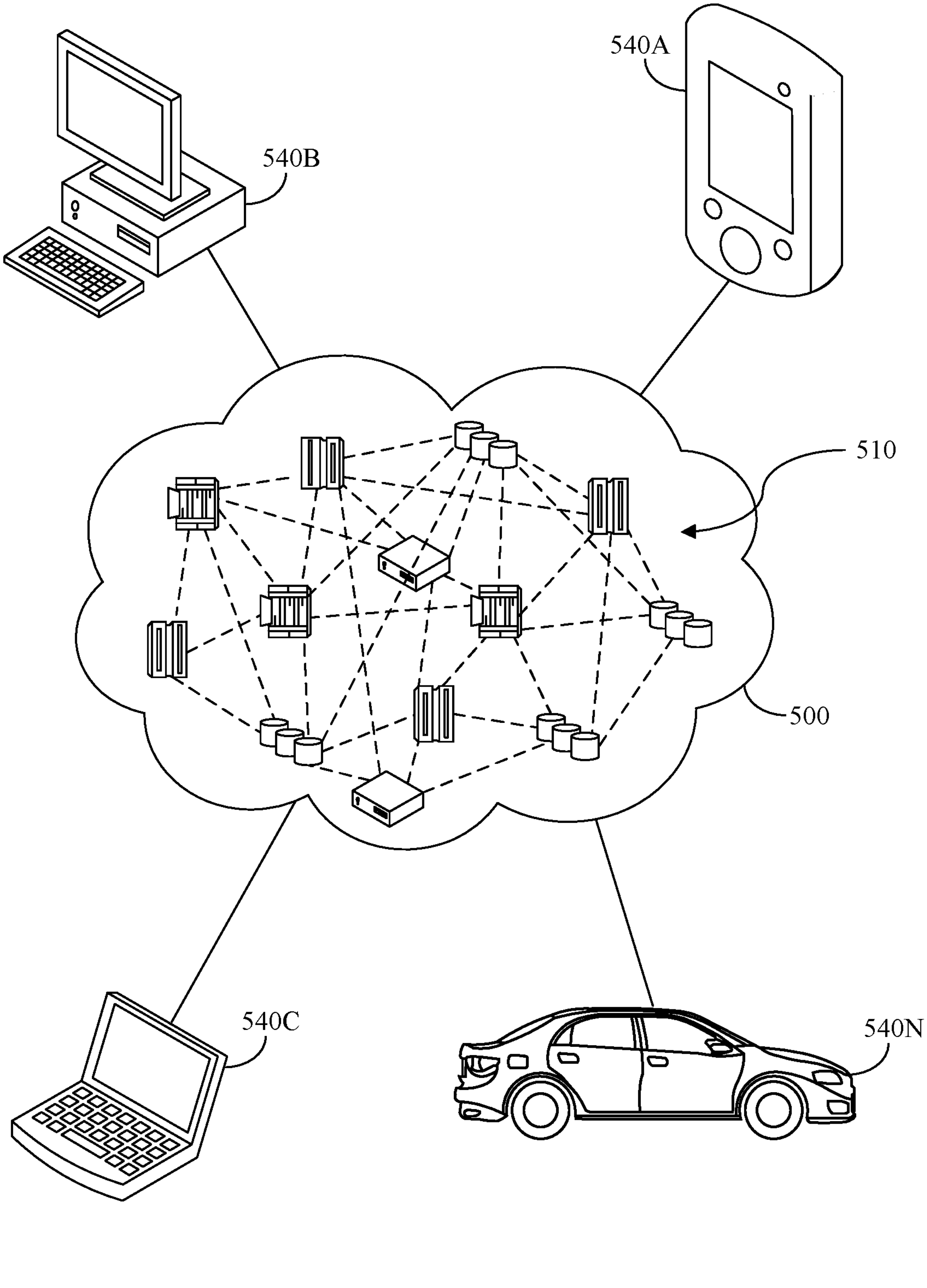
FIG. 5 illustrates a cloud computing environment.
Figure 6:
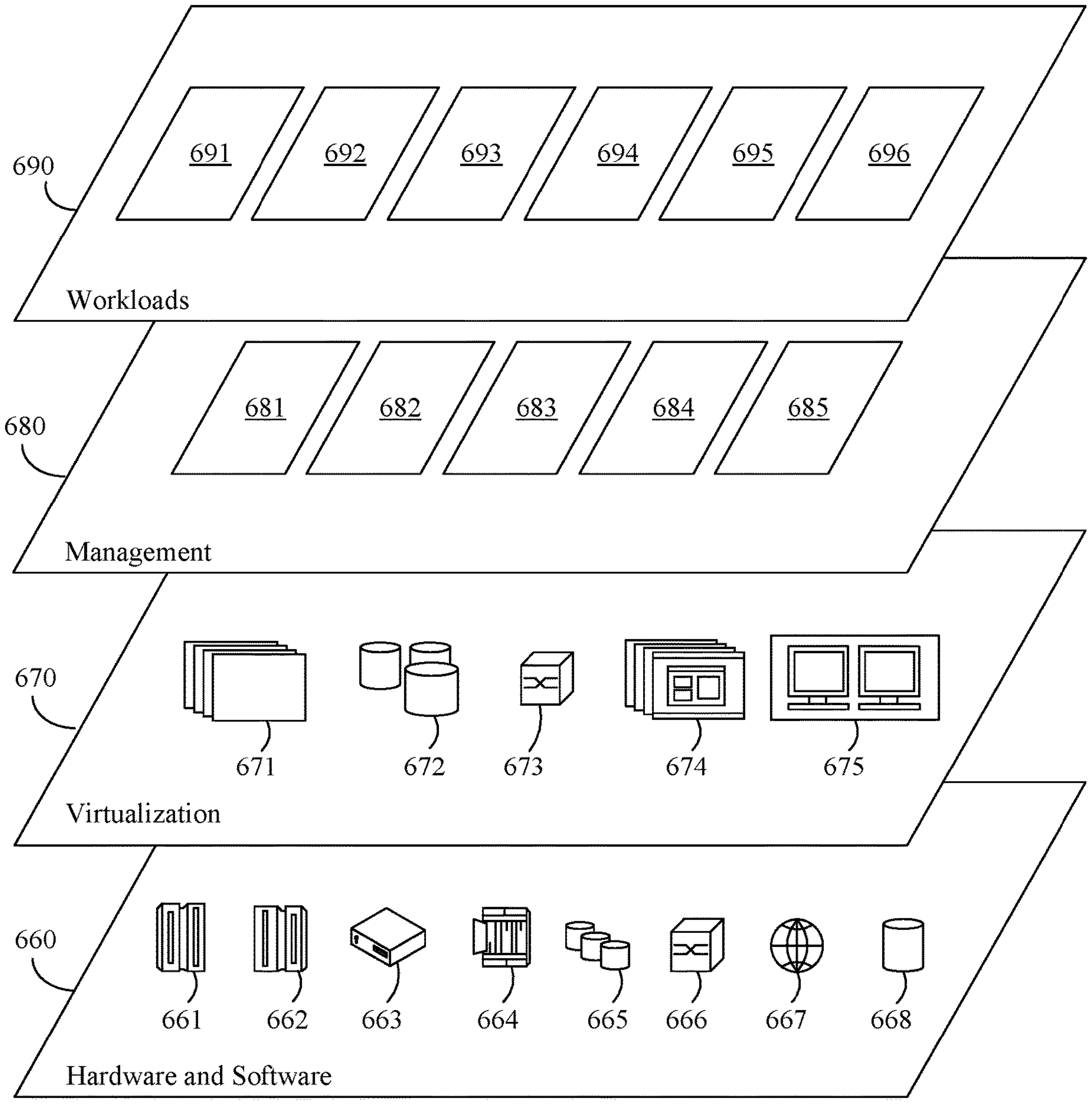
FIG. 6 illustrates example abstraction model layers of the cloud computing environment of FIG. 5.

FIGS. 1 and 2, respectively, illustrate example real-time computing resource deployment and integration system (system) 100 and method 200 performed by system 100. System 100 illustratively includes script generator 102, automated gatherer 104, automated watcher 106, analyzer 108, and feeder 110. With system 100 running in the background of a computer system, script generator 102 can automate the deployment of a cloud-based service that meets computer system priorities automatically determined by automated gather 104 and that is identified by automated watcher 106. As defined herein, "service" means performing one or more computing operations and/or provisioning one or more other computing resources by a cloud-based service provider within a cloud computing environment. The computing resources can include, for example, networks, network bandwidth, servers, processing, memory, storage, applications, virtual machines, other computing resources delivered as services by a cloud-based service provider in a cloud computing environment (FIGS. 5 and 6). The deployment and integration of the cloud-based service is invoked in response to analyzer 108 determining that a reconfiguration of the computer system by deployment and integration of the cloud-based service sufficiently improves the functioning of the computer system according to certain user-prescribed objectives or requirements. The objectives, for example, can include increased data throughput, enhanced information governance, and/or a cost reduction. The objectives or requirements can be specified by the user through feeder 110.

Figure 4:
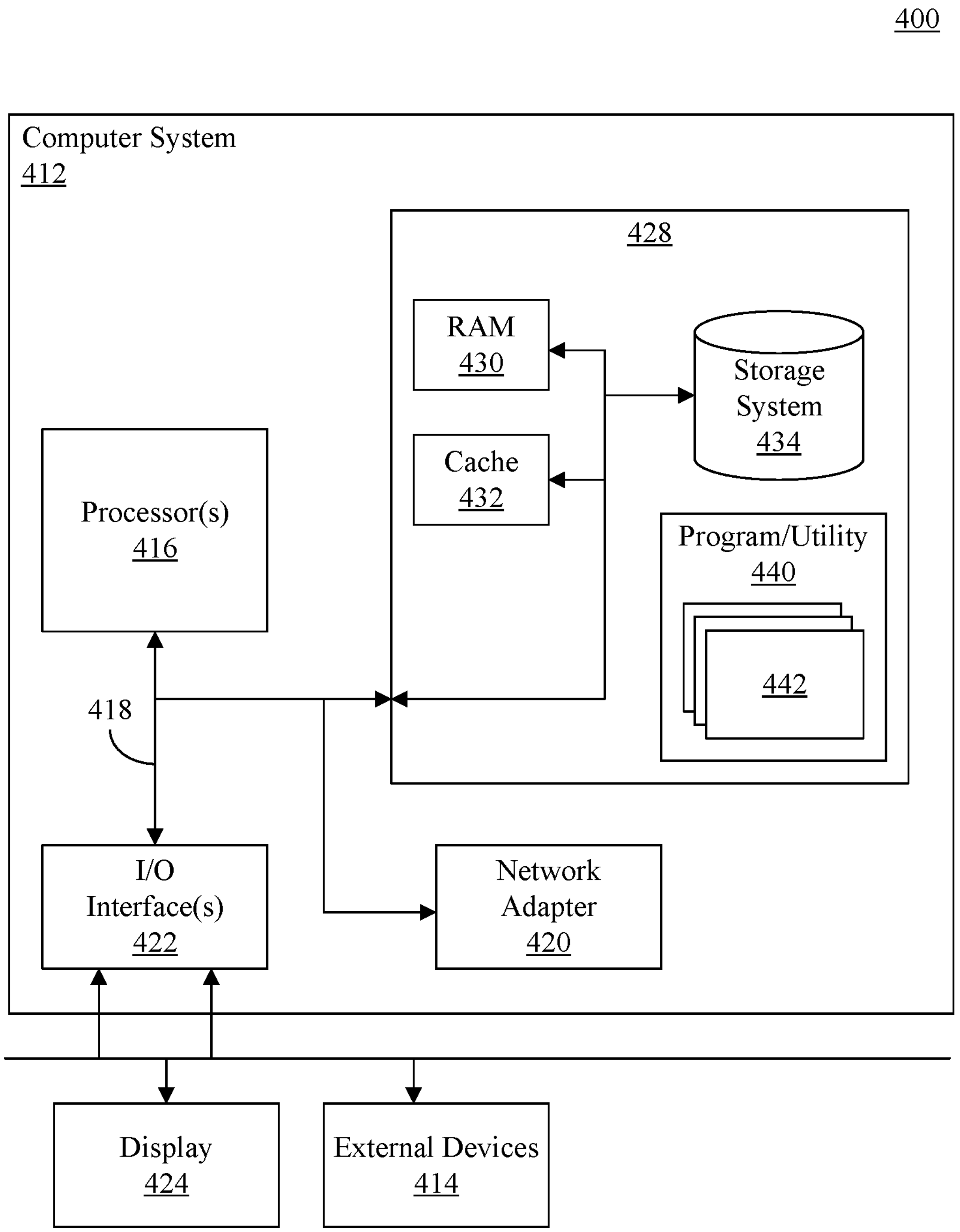
FIG. 4 illustrates a computing node for implementing the system of FIG. 1.

In various embodiments, script generator 102, automated gatherer 104, automated watcher 106, analyzer 108, and feeder 110 can be implemented in hardware (e.g., dedicated hardwired circuitry), software (e.g., program code executed by one or more processors), or a combination thereof. For example, system 100 in certain embodiments is implemented in a computing node, such as computing node 400 (e.g., cloud-based server), in which system 100 comprises program code that is electronically stored in a memory, such as memory 428, and executes on one or more processors, such as processor 416 of computer system 412 (FIG. 4).

System 100 can be integrated in or operatively couple to user computer system 112. User computer system 112 can comprise, for example, an enterprise network or other type of computer system that includes physical devices (e.g., computers, routers, switches) as well as virtual and logical elements, including software applications and protocols for processing and transmitting data. Illustratively, user computer system 112 is an enterprise network, at least a portion of which includes computers 114, wireless devices 116, wireless access point 118, network switch 120, hub 122, peripheral 124, IP telephony server 128, and network servers 130, each of which is interconnected via backbone switch 132. Firewall 134 is interposed between backbone switch 132 and router 136, which communicatively couples to a data communication network (e.g., the Internet, wide-area network (WAN), local-area network (LAN)). User computer system 112 communicatively couples to system 100 via router 136. It will be readily apparent to one skilled in the art that in various arrangements user computer system 112 can include various other devices and/or fewer devices than shown. Likewise, system 100 can communicatively couple, via a wired or wireless connection, to user computer system 112 through various data communication networks, such as the Internet, a wide area network (WAN), a local area network (LAN).

Operatively, at block 202, system 100 determines one or more performance priorities for user computer system 112. System 100 determines the performance priorities of user computer system 112 based on performance metrics 138 automatically acquired by automated gatherer 104 from one or more of the various devices of user computer system 112. Performance metrics 138 can include costs associated with cloud-based services deployed by user computer system 112. Performance metrics 138 can include information governance, such as data processing compliance with HIPPA or other governmental regulation related to data handling by user computer system 112. Performance metrics 138 can include networked device-generated metrics associated, for example, with data throughput, memory management, concurrency control, load balance, network parameters, operating system calls and functions, visualization parameters, and the like.

At block 204, automated watcher 106 detects a candidate cloud-based service among one or more cloud-based services identified among those offered by one or more cloud-based service providers, illustrated by cloud-based service providers 140*a*, 140*b*, and 140*n*, that have not previously been analyzed by system 100. Automated watcher 106, to identify cloud-based services not previously analyzed by system 100, can automatically search various network sites maintained by cloud-based service providers 140*a*, 140*b*, and 140*n*. The network sites of service providers 140*a*, 140*b*, and 140*n* are publicly accessible and, in various embodiments, are searched by automated watcher 106 continuously, or nearly so at regular or irregular intervals. Automated watcher 106 detects the candidate cloud-based service based on candidate performance metrics, according to which automated watcher 106 determines a likelihood that the candidate cloud-based service may enhance one or more performance priorities determined at block 204.

Automated watcher 106 can collect candidate performance metrics 142 corresponding to the one or more performance priorities, for example, from the specifications and other publications related to each cloud-based service offered by service providers 140*a*, 140*b*, and 140*n*. Optionally, the information provided by candidate performance metrics 142 corresponding to the one or more performance priorities can be supplemented by information from sources not directly related to service providers 140*a*, 140*b*, and 140*n*. Supplemental information can include customer reviews and independent reviewer assessments that automated watcher 106 automatically identifies through searching various network sites to thereby identify cloud-based services as soon as, or soon after, the services are made accessible by one or more of service providers 140*a*, 140*b*, and 140*n*.

At block 206, analyzer 108 compares the current performance of user computer system 112 with what the performance of user computer system 112 would likely be achievable if the candidate cloud-based service were deployed to user computer system 112. Analyzer 108, in making the comparison, compares performance metrics—one or more performance metrics from user computer system 112 as currently configured—with one or more performance metrics if user computer system 112 were reconfigured by deployment of the candidate cloud-based service. The comparing can reveal whether performance of user computer system 112 if the candidate cloud-based service were deployed improves user computer system 112's performance with respect to the one or more performance metrics. For example, if throughput or latency is a priority, the published performance metrics of a cloud-based service that indicate that the throughput or latency achieved with the cloud-based service are likely to exceed that currently observed for user computer system 112 as presently configured makes the cloud-based service a candidate for deployment.

At block 208, analyzer 108 determines based on the comparing whether deploying the candidate cloud-based service to user computer system 112 improves the performance of user computer system 112 relative to user computer system 112's current performance with respect to the one or more performance priorities determined at block 202. For example, the candidate cloud-based service may be one that provides higher throughput, more reliable information governance, cost reduction, and/or improvement with respect to one or more other performance metrics corresponding to the one or more performance priorities.

At block 210, script generator 102 generates script 144 in response to analyzer 108 determining that deploying the candidate cloud-based service improves performance of the user computer system with respect to the performance priorities. Script 144, when executed with one or more devices of user computer system 112, is capable of reconfiguring in real-time user computer system 112 by automatically deploying to and integrating in user computer system 112 the candidate cloud-based service. Thus, executing script 144 can initiate deployment of the candidate cloud-based service. Once the deployment is initiated, user computer system 112 is reconfigured according to script 144.

Script 144 comprises processor-executable code that when executed by one or more devices of user computer system 112 reconfigures the user computer system 112. The reconfiguring is based on deploying and integrating one or more selected cloud-based services in user computer system 112. Script 144 can be a single file, automatically generated by script generator 102, that specifies parameters for automatically deploying the one or more cloud-based services and integrating the one or more cloud-based service with other elements of user computer system 112. Script 144, for example, can comprise declarative code for provisioning, managing configuration, and deploying the one or more cloud-based services. The declarative code can specify, for example, REST APIs, containers, microservers, serverless functions, and the like for deploying the one or more cloud-based services.

Reconfiguration of user computer system 112 can include deployment of one or more cloud-based services according to user-specific objectives. Script generator 102 can generate and maintain deployment scripts for various cloud-based computing resources provisioned by the different cloud-based service providers. Such resources can include infrastructure as code (IaC) for provisioning and managing data centers through machine-readable definition files as well as applications. In certain arrangements, script generator 102 generates and maintains a single deployment file that manages dependencies between the different cloud-based resources as well as the user's own in-house or on-premises computing resources. The dependencies can include any relationship in which one software program or application relies on another during one or more phases of execution. For example, with respect to a service that requires a database, the dependency may be the necessity of instantiating the database prior to deploying the service so that the service can be configured to access the database that already has been instantiated.

Script generator 102, in certain embodiments, can generate script 144 based on candidate performance metrics 142, which are retrieved by automated watcher 106 and analyzed by analyzer 108. Script 144 generated by script generator 102, for example, can be a deployable bash script, declarative script, or other type of script specified by user input to system 100. Script generator 102 can utilize application programming interfaces (APIs) and other automated integration parameters specified by the cloud-based service provider that provides the candidate cloud-based service. For example, script generator 102 can incorporate a command line interface (CLI) that is part of the service offering of the cloud-based service provider and can utilize various CLI tools and REST APIs of the cloud-based service provider. Script generator 102 also can automatically identify an order of deployment based on parameters specified by the cloud-based service provider. For example, automated deployment using a container orchestration system (e.g., IBM Cloud Kubernetes Service® (IKS)) may dictate the deployment order, such as the requirement that a resource group be created prior to creating an IBM IKS® cluster. Script generator 102 also can identify dependencies based on RPA workflows and logs corresponding to the applications and/or cloud-based services already deployed and integrated in user computer system 112.

In certain embodiments, analyzer 108 determines in real-time a performance delta. In accordance with these embodiments, the performance delta is the difference between a first performance score and a second performance score, both based on performance metrics associated, respectively, with a candidate cloud-based service and user computer system 112. The first performance score is a quantitative measure of how well a reconfiguration of the current configuration of computer system 112 would meet the performance priorities were one or more candidate cloud-based services deployed and integrated into user computer system 112. For example, if data throughput is a priority, analyzer 108 can generate a first performance score that, based on candidate performance metrics 142, measures data throughput (e.g., bps) were a candidate cloud-based service deployed and integrated in user computer system 112. Analyzer 108, for example, can generate a first performance score that indicates, in the context of information governance, the percentage of data protection requirements that would be met were a candidate cloud-based service deployed and integrated in user computer system 112. The first performance score can equal the monetary cost of deploying the candidate cloud-based service. In some embodiments, the performance score is a composite of two or more scores, each corresponding to a user-specified priority and weighted according to a user-specified ranking of the priorities. The second performance score provides a corresponding quantitative measure of the extent to which the computer system 112, as currently configured, meets the same one or more performance priorities.

Analyzer 108 can determine whether the performance delta is greater than a predetermined threshold. For example, the performance delta may require that data throughput increase by more than a 10 percent threshold or that information governance meet all requirements while reducing costs of compliance by 10 percent. Thus, the predetermined threshold, in certain embodiments, is based at least in part on cost considerations, namely whether the processing improvement achieved by reconfiguring the user computer system 112 through deployment and integration of a cloud-based services exceeds the cost of doing so. If the performance delta is not greater than the predetermined threshold, system 100 can continue running in the background of the user computer system 112, monitoring network sites for other previously unanalyzed cloud-based services in parallel with monitoring for changes in one or more of the user's processing priorities. If, however, the performance delta is greater than the predetermined threshold, then script generator 102 is invoked.

User computer system 112, as is typical for many enterprise networks and similar systems, can rely on multiple cloud-based services provided by different cloud-based service providers. For example, user computer system 112 may include one or more user interfaces hosted on an AWS® cloud and incorporate one or more Azure®-hosted APIs, while relying in part on Google AutoML® for certain data processing functions. Based on candidate performance metrics 142 retrieved by automated watcher 106 and analyzed by analyzer 108, the determination may be made by system 100 that swapping out one cloud-based service for a previously unanalyzed one can improve user computer system 112's performance with one or more processing priorities. The determination may be that a previously unanalyzed cloud-based service offers the same level of performance but does so at a lower cost.

In certain embodiments, analyzer 108 has access to financial data showing the user's expenditures on various cloud-based resources obtained through one or more cloud-based service providers. The financial data can include itemized billing records (assuming the user has consented to share the information) with respect to each cloud-based service purchased from one or more cloud-based providers. Analyzer 108 can compare itemized expenditures on current cloud-based services with the potential spending on a candidate cloud-based service. An expected performance of the candidate cloud-based service can be determined by analyzer 108 based on performance metrics 138 obtained from one or more data sources (e.g., cloud-based service provider, independent reviewers, user comments). An RPA module can correlate the expected performance determined by analyzer 108 with RPA-determined workflows generated by user computer system 112 as currently configured. Based on the correlating, analyzer 108 can determine whether deployment of the candidate cloud-based service offers an improvement in terms of a trade-off between technical capabilities resulting from the deployment and costs incurred with the deployment.

Analyzer 108 in various embodiments is implemented as an intelligent system capable of analyzing various parameters. The various parameters can include system-related performance parameters such as data throughput as well as parameters such as the user's expenditures on cloud-based services, the extent and availability of the user's in-house resource, including both hardware and software. Analyzer 108, in certain embodiments, is capable of determining a mix of such resources by optimizing parameters according to the user's priorities, such as throughput and information governance, subject to certain constraints such as cost constraints. For example, in certain embodiments, analyzer 108 determines the parameter values based on solving a constrained optimization problem.

In some embodiments, analyzer 108 uses RPA to continuously, or periodically, monitor cloud-based services and/or user-developed applications, as well as the deployment and integration of such services and applications. Based on learnings derived using RPA, analyzer 108 analyzes the effects of a reconfiguration of user computer system 112 in response to a change in the user's processing priorities and/or the introduction of one or more services of one or more cloud-based service providers that have not previously been identified. Analyzer 108, in certain embodiments, implements one or more RPA modules that learn processing operations performed by user computer system 112 and, based on the learning, automatically identify the changes in the user's processing priorities. In some embodiments, the RPA module(s) can identify applications and/or processes that are more frequently executed relative to others and, accordingly, can identify a relative importance of each application and/or process.

Optionally, analyzer 108 can automatically generate an analysis of the pros and cons of each potential reconfiguration of user computer system 112. At the user's election, however, analyzer 108 can automatically respond to any change in the user's processing priorities and/or the introduction of one or more new services to determine whether a specific reconfiguration remediates a deficiency or enhances the performance of user computer system 112. In certain embodiments, analyzer 108 implements one or more RPA modules configured to automatically implement roll-back deployment strategies and to evaluate possible deployments using a dry run or other optimal deployment strategy (e.g., canary deployment, blue-green deployment) so as to reduce the likelihood or extent of down time owing to a change in the user's processing priorities and/or introduction of one or more new cloud-based services. For example, an RPA module utilizing canary deployment can deploy a candidate cloud-based service to a limited set of users and/or to a select group of computing nodes of user computer system 112. If the deployment proves successful—judged, for example, on collected processing metrics such as throughput and/or user feedback—that RPA module can roll out the candidate cloud-based service throughout user computer system 112. Alternatively, the RPA module can utilize blue-green deployment which follows essentially the same procedure, though using roughly half the resources of user computer system 112 for testing the candidate cloud-based service. Though canary deployment is thought by some to be less risky and provide better insight, both canary and blue-green deployment can be used to test a candidate cloud-based service prior to full deployment to user computer system 112.

Feeder 110 electronically stores user input for prioritizing certain processing parameters such as throughput, governance, and/or cost. Based on the user input, system 100 can respond to the introduction of one or more new cloud-based services. System 100 can initiate an RPA workflow based on the user input. An RPA module can be incorporated with one or more enterprise or other modules of user computer system 112. Data recorded by the RPA module can be fed into script generator 102. Script generator can use the data to revise user priorities and fetch data from analyzer 108 to revise scripts generated by script generator 102.

Automated gatherer 104, in certain embodiments, implements one or more RPA modules. The RPA module(s) enable automated gatherer 104 to learn workflows encompassing multiple processing procedures and applications that are performed by user computer system 112. Based on the information gathered through the RPA, automated gatherer 104 can discover the user's priorities (e.g., data throughput, information governance). Automated gatherer 104 in certain arrangements can additionally, or alternatively, analyze and correlate financial expenditures allocated to cloud providers and/or internal infrastructure of the current configuration of user computer system 112. In still other arrangements, automated gather 104 implements machine learning (e.g., deep learning classifier model) to classify different priorities of the user and to classify each priority based on relative importance. Automated gather 104 can rank order each priority based on the relative importance of each based on machine learning classification of the different priorities. Additionally, or alternatively, in yet other arrangements, automated gatherer 104 implements machine learning (e.g., reinforcement learning) to identify changes in the priorities. The user may be a business enterprise that from time-to-time initiates one or more new ventures and/or revises its business model, strategies, or marketing mix, for example. Based on predictions or classification models generated through machine learning, automatic gatherer 104 can respond by resetting the RPA module(s) to capture changes in the user's processing priorities.

The processing priorities can correspond to various factors. Geography, for example, is a factor if information governance in some countries imposes greater restrictions on data handling than do other countries. For a business enterprise, marketing strategies can be a factor. If introducing a new product, for example, cost may not be a priority for the business enterprise seeking to configure its enterprise network to perform certain functions likely to win it substantial market share, with concomitant long-term benefits. Automated gather 104 can use one or more intelligent RPA modules to gather performance metrics 138 and other data (e.g., internal documents) from which the user's objectives and priorities (assuming user consent for collecting such information) can be inferred. The performance metrics 138 and other data can be combined with candidate performance metrics 142 collected by automated watcher 106, which can be analyzed by analyzer 108 for determining a configuration of user computer system 112—including one or more cloud-based services—that is likely to optimize user computer system 112's performance with respect to one or more priorities.

Automated watcher 106, in certain embodiments, integrates with IaC software tools (e.g., Terraform®) in identifying new cloud service providers and related information. Additionally, or alternatively, automated watcher 106 can monitor native deployers associated with different cloud-based service providers to update information on the availability of cloud-based services previously unanalyzed by system 100. Both automated gather 104 and automated watcher 106 can run in parallel and can continually or periodically to discover changes in user priorities and detect the introduction of new cloud-based services.

Figure 3:
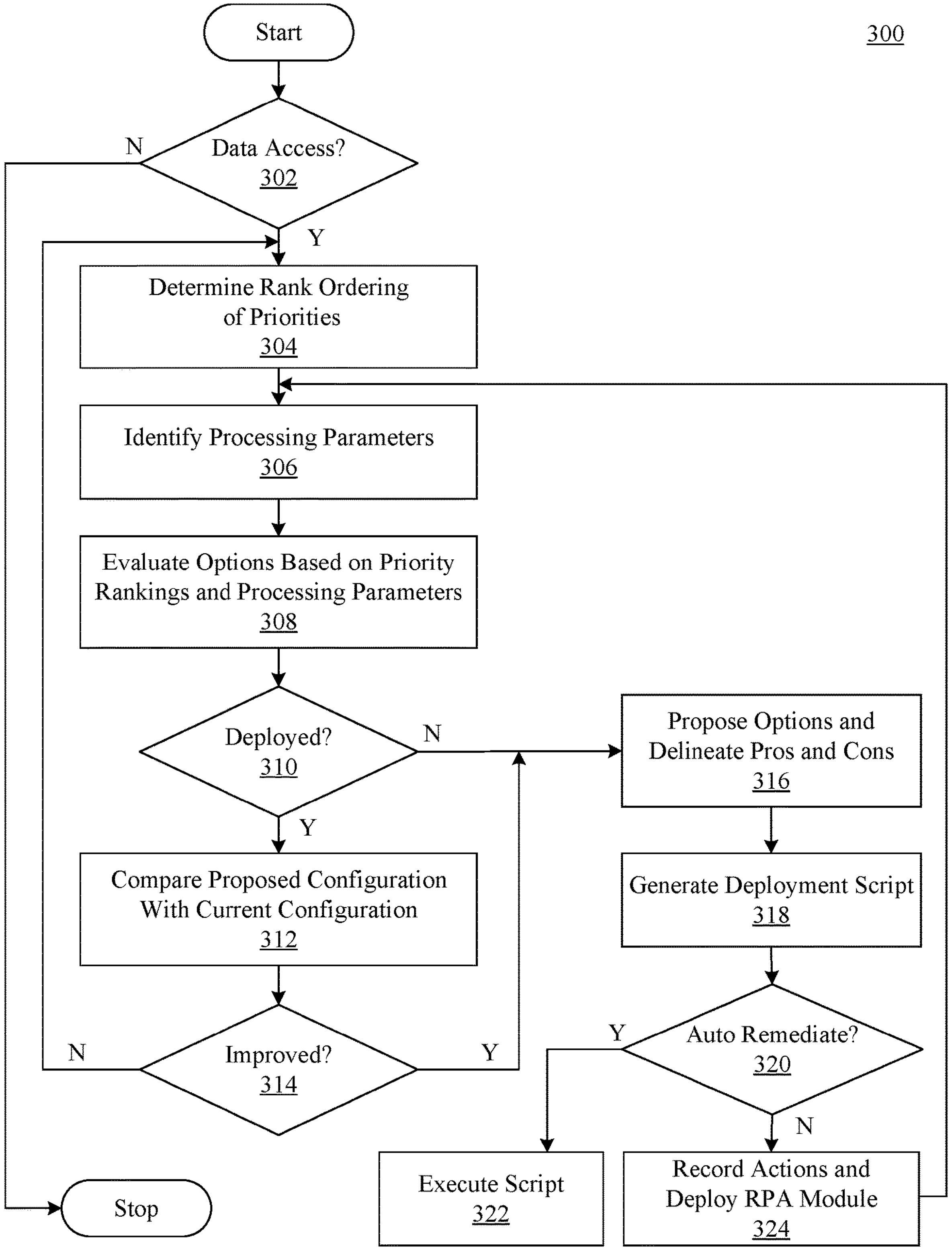
FIG. 3 illustrates another example method performed by the system of FIG. 1.

FIG. 3 illustrates an example method 300 for real-time deployment of resources to improve or remediate a user computer system. Method 300 can be implemented in a system the same as or similar to system 100. The system, in some arrangements, can be implemented in a server for providing real-time deployment of resources to multiple users as clients who access the server via a data communications network (e.g., the Internet).

At block 302, the system optionally determines whether a client has granted the system access to client data, such as financial data pertaining to expenditures on various computing resources. No further operations are performed by the system if access is denied. If access is granted, however, the system continues to monitor the client's computer system until receiving an explicit command to end the monitoring of the client's computer system.

At block 304, the system determines a rank ordering of the client's processing priorities. The priorities can include, for example, data throughput, information governance, cost expenditures, or a combination of each. The ranking of the client's priorities, in some embodiments, is determined based on explicit input of the client. In other embodiments, one or more RPA modules infers the ranking of priorities from workflows tracked by the RPA module(s) and/or based on machine the learning described above.

At block 306, the system identifies various processing parameters. The parameters can include, for example, types of data processed by the client's computer system and information governance requirements (e.g., HIPPA compliance for a healthcare provider). In certain arrangements, the system determines which of the available cloud-based services comply with predetermined restrictions to which the client adheres, whether voluntarily or per some mandate.

At block 308, the system evaluates various options for deploying additional or different resources to the client's computer system. For example, the system can continuously or periodically monitor various network sites to identify cloud-based services not previously analyzed by the system. Each such cloud-based service can be evaluated in the context of the client's rank-ordered priorities and collected processing parameters.

At block 310, the system determines whether a similar resource or the same resource provided by a different cloud-based service provider has already been deployed to the client's computer system. If a similar resource is already deployed, the system at block 312 compares the performance of the client's computer system using the already-deployed resources with a simulated performance of the client's computer system using the simulated resource in place of the simulated resource. If the resource is the same as one already deployed by a different cloud-based service provider, the system performs a cost analysis at block 312 to determine whether the same performance can be achieved less expensively using a resource provided by a cloud-based service provider different from the one whose resource is currently deployed. In either event, if at block 314 the system determines that there is no technical or economic improvement with the evaluated resource, then the system resumes monitoring the client's computer system at block 304. Otherwise, if at block 314 the system determines that there is an improvement, then the system optionally generates at block 316 an analysis delineating the pros and cons of reconfiguring the client's computer system by deploying the evaluated resource. For example, given that a priority is throughput or information governance, a resource that increases throughput or enhances information governance favors deployment (is pro), whereas incurring a greater cost to obtain the resource argues against deployment (is con).

If evaluation of a previously unanalyzed or replacement resource is determined by the system to offer an improvement to the client's computer system, then the system generates a deployment script at block 318. The script can comprise declarative code and collected processing parameters for deploying the evaluated resource to the client's computer system. At block 320, the system determines based on client input whether the client has authorized an automated remediation of the client's computer system. If so, then at block 322, the system executes the deployment script. Executing the script automatically reconfigures the client's computer system based on the declarative code and collected processing parameters, in accordance with which the evaluated resource is deployed to and integrated in the client's computer system. Otherwise, if at block 322 the client has not authorized an automated remediation, the system at 324 records the processing actions and deploys an RPA module, which is updated with deployment details (e.g., deployment parameters) for deploying the evaluated resource if the system receives an explicit client instruction to do so since the client has not authorized an automated remediation. Thus, the system can execute the script in response to the explicit input of the client (perhaps after considering the pros and cons), but without authorization for auto remediation, the system awaits an explicit client instruction. In any event, execution of the script initiates deployment of the evaluated resource. Once deployment is initiated (automatically if pre-authorized or in response to explicit client input), the client's computer system can be reconfigured in real-time based on the script. The system resumes monitoring the client's computer system and searching network sites to identify cloud-based services previously unanalyzed by the system.

The system's continued monitoring of the client's computer system can encompass detecting changes in objectives of the client as well as the previously unanalyzed cloud-based services. The objectives can correspond to automated RPA workflows that change as the objectives change. For example, the client's computer system can comprise an enterprise network. If the client enters a new line of endeavor, the workflows likely change as a result. The system detects the changes and adjust priorities on which to detect cloud-based service. For example, if the client begins operating in a new country, the client's priorities may be revised to reflect the new country's more stringent data protection requirements. Thus, the system can detect a cloud-based service to deploy to the client's computer system so that data is electronically stored within the new country as required, that is, in compliance with the more stringent data protection requirements. Accordingly, the system's search and detection of a candidate cloud-based service that allows the data to be electronically stored within the country as required provides a better match to the changed priority. Whenever a candidate cloud-based service is determined by the system to improve the client's computer system in view of such changed priorities of the client, then the system undertakes to deploy the candidate cloud-based service as described above.

In certain embodiments, the system initially can partially deploy the candidate cloud-based service based on the script. The system subsequently can reconfigure the client's computer system based on the script in response to determining, based on the partial deployment, that deploying the candidate cloud-based service improves performance of the client's computer system with respect to one or more performance priorities. In some embodiments, the system implements a partial or phased deployment using canary deployment or blue-green deployment. For example, implementing canary deployment, the system deploys the candidate cloud-based service to a limited set of devices, limited set of users, and/or within a limited geographical area. If partial deployment improves the performance with respect to the portion of the client's computer system affected, then and only then the system undertakes a full deployment.

FIG. 4 illustrates a schematic of an example of a computing node 400. In one or more embodiments, computing node 400 is an example of a suitable cloud computing node. Computing node 400 is not intended to suggest any limitation as to the scope of use or functionality of embodiments of the invention described herein. Computing node 400 is capable of performing any of the functionality described within this disclosure.

Computing node 400 includes a computer system 412, which is operational with numerous other general-purpose or special-purpose computing system environments or configurations. Examples of well-known computing systems, environments, and/or configurations that may be suitable for use with computer system 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 412 may be described in the general context of computer system-executable instructions, such as program modules, being executed by a computer system. Generally, program modules may include routines, programs, objects, components, logic, data structures, and so on that perform particular tasks or implement particular abstract data types. Computer system 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system 412 is shown in the form of a general-purpose computing device. The components of computer system 412 may include, but are not limited to, one or more processors 416, a memory 428, and a bus 418 that couples various system components including memory 428 to processor 416. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 418 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 412 typically includes a variety of computer system-readable media. Such media may be any available media that is accessible by computer system 412, and may include both volatile and non-volatile media, removable and non-removable media.

Memory 428 may include computer system readable media in the form of volatile memory, such as random-access memory (RAM) 430 and/or cache memory 432. Computer system 412 may further include other removable/non-removable, volatile/non-volatile computer system storage media. By way of example, storage system 434 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. For example, one or more of the program modules may include a RTD system, such as system 100, or portions thereof.

Program/utility 440 is executable by processor 416. Program/utility 440 and any data items used, generated, and/or operated upon by computer system 412 are functional data structures that impart functionality when employed by computer system 412. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 412 may also communicate with one or more external devices 414 such as a keyboard, a pointing device, a display 424, etc.; one or more devices that enable a user to interact with computer system 412; and/or any devices (e.g., network card, modem, etc.) that enable computer system 412 to communicate with one or more other computing devices. Such communication can occur via input/output (I/O) interfaces 422. Still, computer system 412 can communicate with one or more networks such as a local area network (LAN), a general wide area network (WAN), and/or a public network (e.g., the Internet) via network adapter 420. As depicted, network adapter 420 communicates with the other components of computer system 412 via bus 418. It should be understood that although not shown, other hardware and/or software components could be used in conjunction with computer system 412. Examples, include, but are not limited to: microcode, device drivers, redundant processing units, external disk drive arrays, RAID systems, tape drives, and data archival storage systems, etc.

While computing node 400 is used to illustrate an example of a cloud computing node, it should be appreciated that a computer system using an architecture the same as or similar to that described in connection with FIG. 4 may be used in a non-cloud computing implementation to perform the various operations described herein. In this regard, the example embodiments described herein are not intended to be limited to a cloud computing environment. Computing node 400 is an example of a data processing system. As defined herein, "data processing system" means one or more hardware systems configured to process data, each hardware system including at least one processor programmed to initiate operations and memory.

Computing node 400 is an example of computer hardware. Computing node 400 may include fewer components than shown or additional components not illustrated in FIG. 4 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 400 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 540*a*, desktop computer 540*b*, laptop computer 540*c*, and/or automobile computer system 540*n* may communicate. Computing nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540*a-n* shown in FIG. 5 are intended to be illustrative only and that computing nodes 510 and cloud computing environment 500 can communicate with any type of computerized device over any type of network and/or network addressable connection (e.g., using a web browser).

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes 661; RISC (Reduced Instruction Set Computer) architecture-based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and real-time computing resource deployment and integration system 696.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, “user” can refer to an organization as well as an individual human being. “Enterprise” refers to an example organization of multiple individuals.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

determining one or more performance priorities for a user computer system based on a plurality of system-generated processing metrics;

detecting, based on the one or more performance priorities, a candidate cloud-based service among one or more previously unanalyzed cloud-based services identified by an automated watcher configured to search a plurality of communication network sites;

comparing, based on performance metrics corresponding to the one or more performance priorities, a current performance of the user computer system and a potential performance of the user computer system likely achievable by deploying the detected candidate cloud-based service on the user computer system, wherein the deploying includes integrating cloud-based resources with on-premises computing resources of the user computer system;

determining, based on the comparing, that deploying the detected candidate cloud-based service on the user computer system increases a performance score of the user computer system with respect to the performance priorities;

generating a script based on the determining that the deploying increases the performance score, wherein:

the script comprises computer-executable code, and the script manages dependencies between the on-premises computing resources and the cloud-based resources; and automatically executing, by one or more devices of the user computer system, the computer-executable code to reconfigure the user computer system by automatically deploying the detected candidate cloud-based service on the user computer system, wherein the reconfiguration of the user computer system corresponds to increase in the performance score of the user computer system with respect to the performance priorities.

2. The computer-implemented method of claim 1, wherein the script comprises a single deployable file configured to deploy, to integrate, and to manage the dependencies between a plurality of cloud-based services and in-house services integrated in the user computer system.

3. The computer-implemented method of claim 2, further comprising continuously or periodically revising, by a script generator, the script in response to at least one of identifying a previously unanalyzed cloud-based service of the one or more previously unanalyzed cloud-based services or a change in the one or more performance priorities, wherein the previously unanalyzed cloud-based service is different from the candidate cloud-based service.

4. The computer-implemented method of claim 1, wherein the determining that the deploying increases the performance score comprises:

collecting performance metrics associated with the one or more previously unanalyzed cloud-based services, wherein the performance metrics are collected in real-time by the automated watcher; and determining that a difference between a first performance score and a second performance score exceeds a predetermined threshold, wherein the first performance score and the second performance score are based, respectively, on the performance metrics associated with the detected candidate cloud-based service and the user computer system as currently configured.

5. The computer-implemented method of claim 4, wherein the predetermined threshold is based, at least in part, on a predetermined cost constraint.

6. The computer-implemented method of claim 1, further comprising:

partially deploying the detected candidate cloud-based service based on the script; and reconfiguring the user computer system based on the script and the determining that the partial deploying of the detected candidate cloud-based service increases the performance score of the user computer system with respect to the performance priorities.

7. The computer-implemented method of claim 1, further comprising:

adjusting the one or more performance priorities based on detecting a change in a robotic process automation (RPA) workflow.

8. The computer-implemented method of claim 1, wherein the one or more performance priorities is selected from a group consisting of cost, data throughput, and data governance.

9. The computer-implemented method of claim 1, wherein the determining of the one or more performance priorities is performed by a robotic process automation (RPA) module.

10. A system, comprising:

one or more processors configured to execute operations comprising:

determining one or more performance priorities for a user computer system based on a plurality of system-generated processing metrics;

detecting, based on at least one performance metric corresponding to the one or more performance priorities, a candidate cloud-based service among one or more previously unanalyzed cloud-based services identified by searching a plurality of communication network sites;

comparing, based on performance metrics corresponding to the one or more performance priorities, a current performance of the user computer system and a potential performance of the user computer system likely achievable by deploying the detected candidate cloud-based service on the user computer system, wherein the deploying includes integrating cloud-based resources with on-premises computing resources of the user computer system;

determining, based on the comparing, that deploying the detected candidate cloud-based service on the user computer system increases a performance score of the user computer system with respect to the performance priorities;

generating a script based on the determining that the deploying increases the performance score, wherein the script comprises computer-executable code, and the script manages dependencies between the on-premises computing resources and the cloud-based resources; and automatically executing, by one or more devices of the user computer system, the computer-executable code to reconfigure the user computer system by automatically deploying the detected candidate cloud-based service on the user computer system, wherein the reconfiguration of the user computer system corresponds to increase in the performance score of the user computer system with respect to the performance priorities.

11. The system of claim 10, wherein the script comprises a single deployable file configured to deploy, to integrate, and to manage the dependencies between a plurality of cloud-based services and in-house services integrated in the user computer system.

12. The system of claim 11, further comprising a script generator that continuously or periodically revises the script in response to at least one of identifying a previously unanalyzed cloud-based service of the one or more previously unanalyzed cloud-based services or a change in the one or more performance priorities, wherein the previously unanalyzed cloud-based service is different from the candidate cloud-based service.

13. The system of claim 10, wherein the determining that the deploying increases the performance score includes:

collecting performance metrics associated with the one or more previously unanalyzed cloud-based services, wherein the performance metrics are collected in real-time by an automated watcher; and determining that a difference between a first performance score and a second performance score exceeds a predetermined threshold, wherein the first performance score and the second performance score are based, respectively, on the performance metrics associated with the detected candidate cloud-based service and the user computer system as currently configured.

14. The system of claim 13, wherein the predetermined threshold is based, at least in part, on a predetermined cost constraint.

15. The system of claim 10, wherein the operations further comprise:

partially deploying the detected candidate cloud-based service based on the script; and reconfiguring the user computer system based on the script and the determining that the partial deploying of the detected candidate cloud-based service increases the performance score of the user computer system with respect to the performance priorities.

16. The system of claim 10, wherein the operations further comprise:

adjusting the one or more performance priorities based on detecting a change in a robotic process automation (RPA) workflow.

17. The system of claim 10, wherein the one or more performance priorities is selected from a group consisting of a monetary cost, data throughput, and data governance.

18. The system of claim 10, wherein the determining of the one or more performance priorities is performed by a robotic process automation (RPA) module.

19. A computer program product, comprising:

one or more computer-readable storage media and program instructions collectively stored on the one or more computer-readable storage media, the program instructions executable by a processor to cause the processor to initiate operations including:

determining one or more performance priorities for a user computer system based on a plurality of system-generated processing metrics;

detecting, based on the one or more performance priorities, a candidate cloud-based service among one or more previously unanalyzed cloud-based services identified by searching a plurality of communication network sites;

comparing, based on performance metrics corresponding to the one or more performance priorities, a current performance of the user computer system and a potential performance of the user computer system likely achievable by deploying the detected candidate cloud-based service on the user computer system, wherein the deploying includes integrating cloud-based resources with on-premises computing resources of the user computer system;

determining, based on the comparing, that deploying the detected candidate cloud-based service on the user computer system increases a performance score of the user computer system with respect to the performance priorities;

generating a script based on the determining that the deploying increases the performance score, wherein the script comprises computer-executable code, and the script manages dependencies between the on-premises computing resources and the cloud-based resources; and automatically executing, by one or more devices of the user computer system, the computer-executable code to reconfigure the user computer system by automatically deploying the detected candidate cloud-based service on the user computer system, wherein the reconfiguration of the user computer system corresponds to increase in the performance score of the user computer system with respect to the performance priorities.

20. The computer program product of claim 19, wherein the script comprises a single deployable file configured to deploy, to integrate, and to manage the dependencies between a plurality of cloud-based services and in-house services integrated in the user computer system.

* * * * *